Dec. 29, 1942.  J. R. PROCTOR  2,306,831
METHOD AND APPARATUS FOR INSURING FLOW OF VISCOUS LIQUID
Filed Dec. 17, 1940  4 Sheets-Sheet 1

Inventor
John R. Proctor
By Richard L. Underwood
Attorney

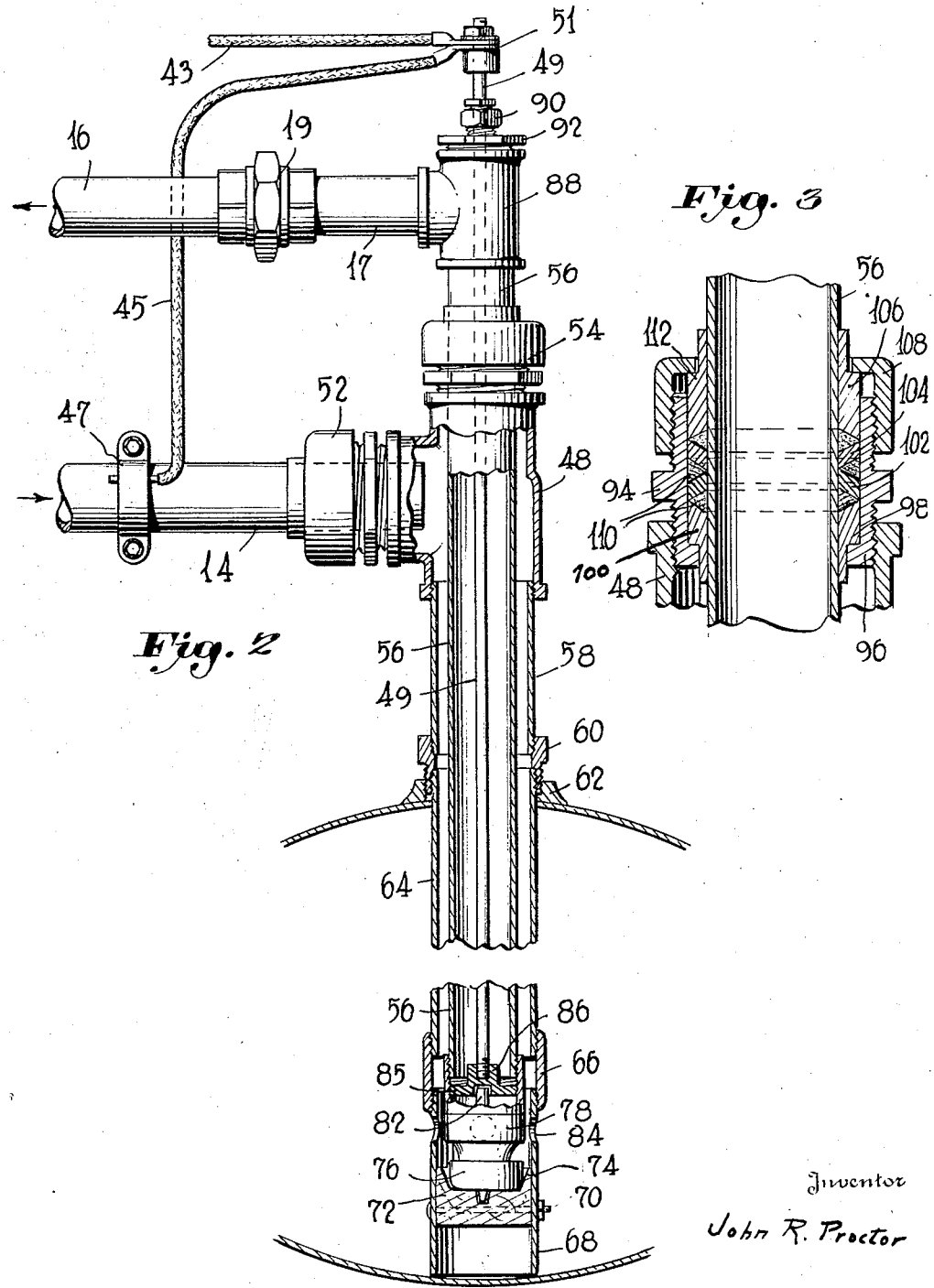

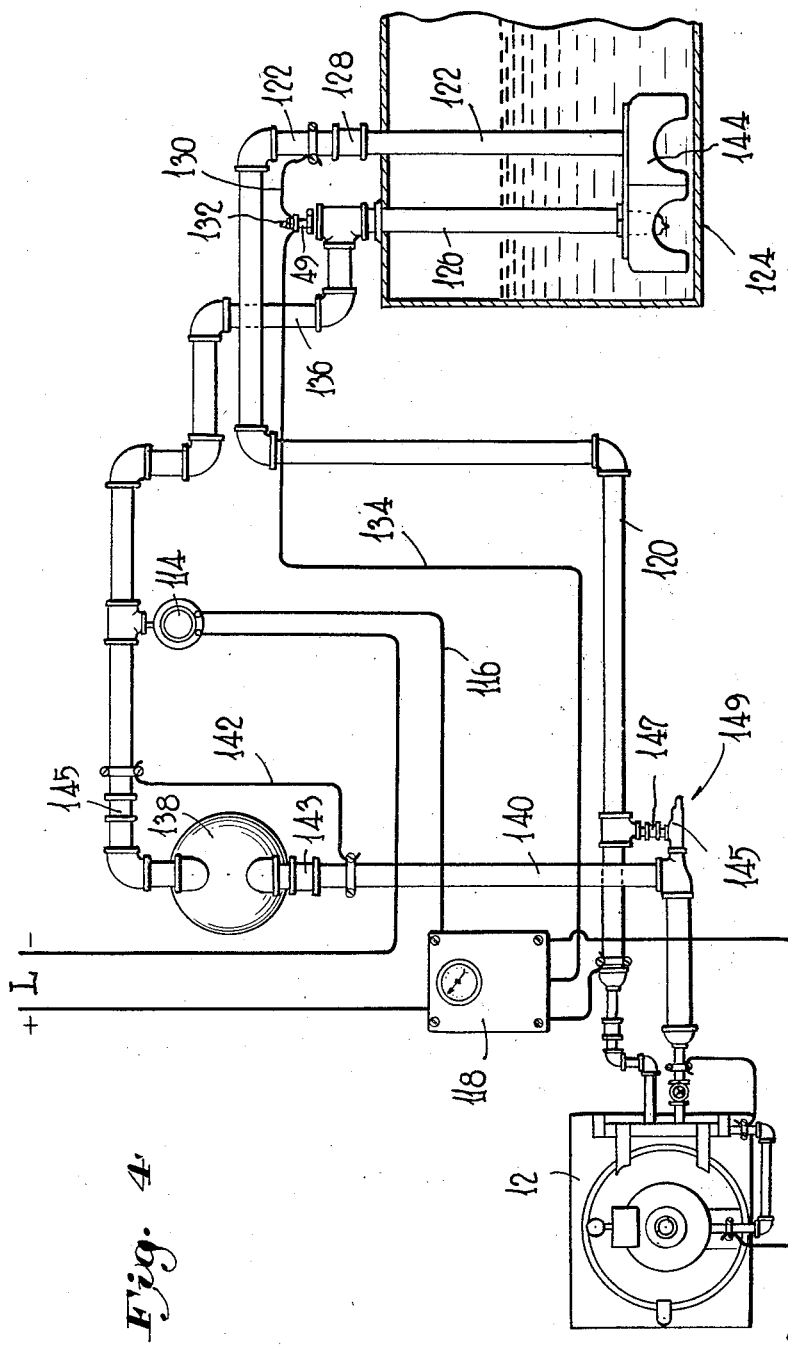

Dec. 29, 1942.    J. R. PROCTOR    2,306,831
METHOD AND APPARATUS FOR INSURING FLOW OF VISCOUS LIQUID
Filed Dec. 17, 1940    4 Sheets-Sheet 4
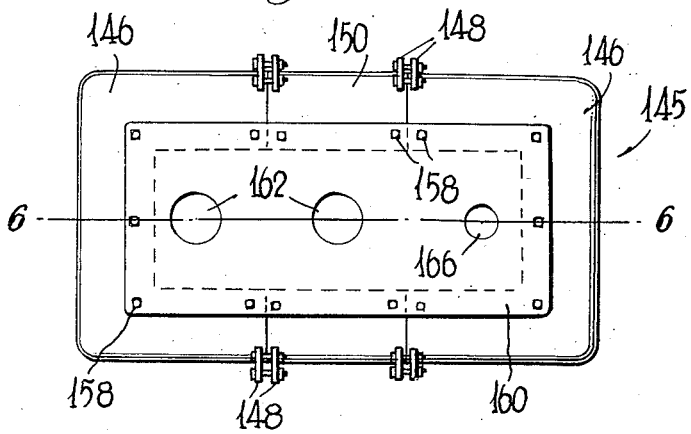
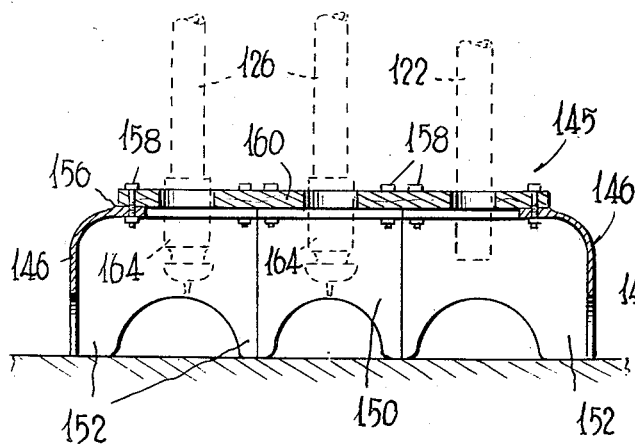
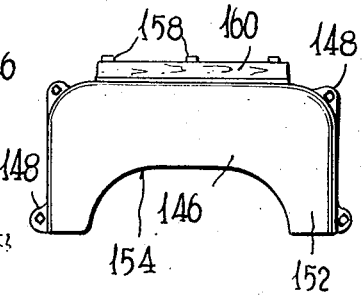
Inventor
John R. Proctor
By Richard L. Underwood
Attorney Patented Dec. 29, 1942

2,306,831

UNITED STATES PATENT OFFICE 2,306,831

METHOD OF AND APPARATUS FOR INSURING FLOW OF VISCOUS LIQUID

John R. Proctor, Bayonne, N. J., assignor to Preferred Utilities Company, Inc., New York, N. Y., a corporation of Delaware Application December 17, 1940, Serial No. 370,534

43 Claims. (Cl. 219—39)

This invention relates to a method of and apparatus for insuring uniform flow of viscous liquids in flow systems of various types, and has particular reference to maintaining uniformity of flow in oil burner lines wherein a heavy grade of commercial oil is used. This application constitutes a continuation in part of my application Serial No. 258,346, filed February 24, 1939.

The invention contemplates an arrangement wherein a consumer, such as an oil burner, is positioned in one location, a supply tank in another and in all probability quite remote from the consumer, the two being connected by feed and return pipes, respectively, whereby the liquid is fed to the consumer and such portion as is not used is returned to the tank. Among the objects of the invention is the efficient and economical use of heat applied to the oil flowing through the pipes at one or more points for maintaining a constant temperature of the liquid fed to the consumer. While the form illustrated in the drawings and described herein embodies the use of an electric current as a heat source, this particular source is not essential to certain phases of the invention, nor is the fact that the pipes lines themselves are incorporated in an electric circuit for the purpose of heating the oil flowing therethrough essential to certain portions of the invention.

A phase of the invention of extreme importance and quite unrelated to the particular type of heat source utilized or the manner of its application to the liquid resides in the use of the heat remaining in such portions of the liquid fed to the consumer as are permitted to pass on into the return pipe for heating the liquid drawn into the feed pipe from the supply tank. Several means for accomplishing this desirable end have been illustrated and described herein, each of which embodies the concept of discharging the heated liquid from the return pipe into the supply tank in proximity to a portion of the feed line, a suction stub, which extends into the tank to thereby transfer a portion of its remaining heat to the liquid passing up into the feed pipe. The returned liquid may be intimately mixed with unheated liquid designed to pass into the feed line to thereby transfer its heat and, in addition, the returned heated liquid may be discharged into the supply tank in such manner that it contacts the outer wall of the feed pipe throughout that portion which extends within the supply tank.

In discharging the returned heated fluid into the tank in proximity to the suction end of the feed pipe it becomes important to concentrate the discharged liquid about the end of the stub and control the quantity of unheated liquid flowing from elsewhere in the tank to the end of the stub. Means have been incorporated in the apparatus disclosed and illustrated herein for accomplishing such end.

A further important feature of the invention resides in supplying the heat to the liquid electrically and more particularly by heating the pipes through which the oil passes by including them in an electric circuit, particularly a circuit wherein the amount of current passed through the feed and return pipes respectively may be balanced, one against the other, substantially at will regardless of the resistance in each due to size, length, etc. This particular portion of the invention constitutes an improvement over that described and claimed in my copending application to which reference is made above.

A meritorious feature of the invention resides in the fact that the suction stub and its associated foot valve may easily be withdrawn from the tank as an integral unit without disturbing any other portion of the mechanism. This constitutes an important advantage, since withdrawal is necessary from time to time for various purposes.

Other important features of the invention reside in the manner in which the feed and return pipes extend within the supply tank and are arranged to facilitate transfer of heat from returned liquid to that drawn through the feed line, and to permit extension of the electric heating circuit within the supply tank to thereby obtain maximum efficiency of heat transfer and, consequently, liquid flow.

Various other objects and meritorious features of the invention will become apparent from the following description taken in conjunction with the drawings, wherein like numerals refer to like parts throughout the several figures, and wherein:

Fig. 2 is an elevation, partly in section, illustrating one manner of concentrating the heated liquid discharged into the tank;

Fig. 3 is an enlarged sectional view of an improved insulated coupling;

Fig. 4 is a diagrammatic illustration of a somewhat modified form of installation;

Fig. 5 is a top plan view of a modified discharge concentrating arrangement illustrated in Fig. 4;

Fig. 6 is a section along 6—6 of Fig. 5, and
Fig. 7 is an end view of the structure illustrated in Fig. 5.

Figure 1:
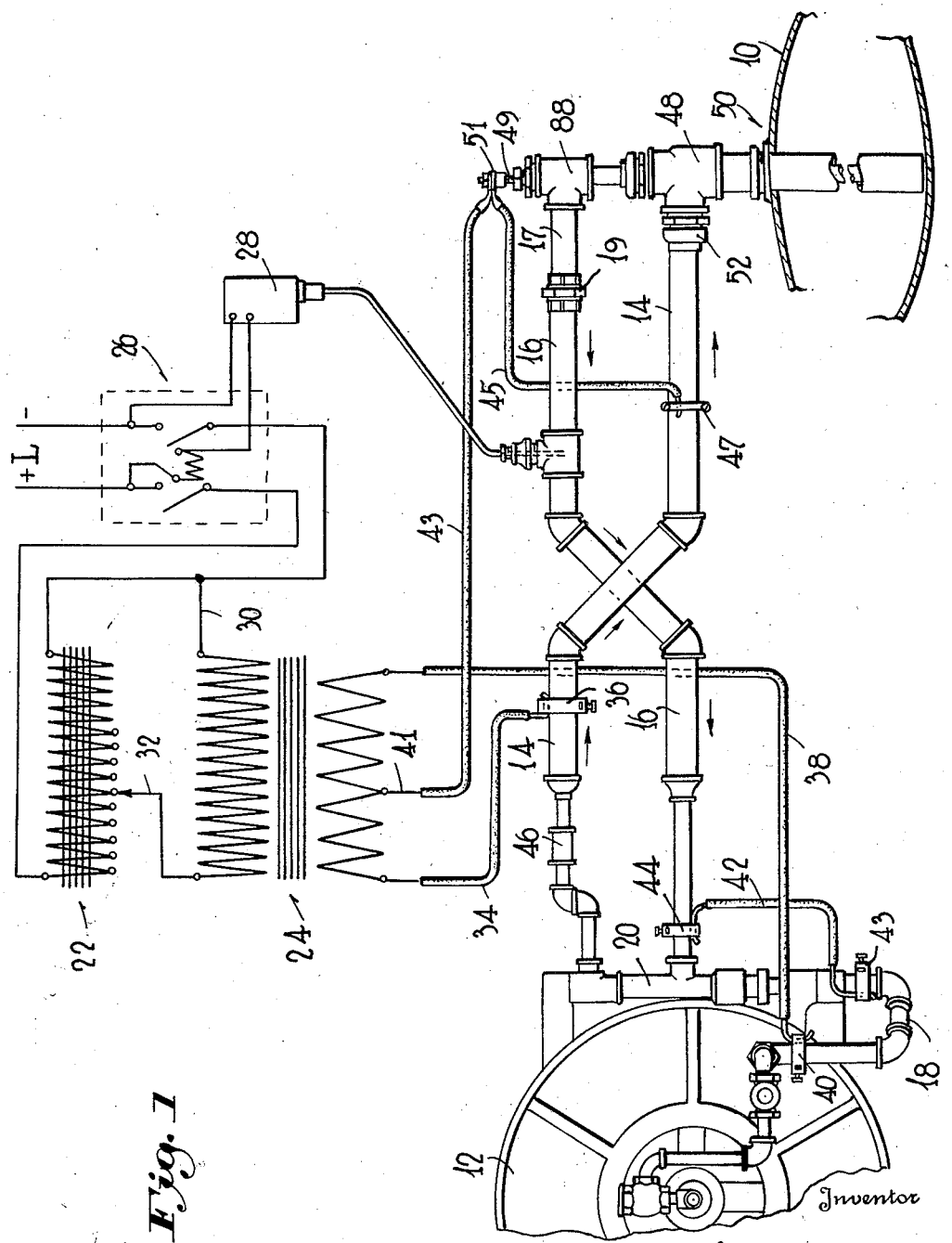
Figure 1 is a diagrammatic illustration of one form of installation.

Referring now to Fig. 1, the numeral 10 indicates a supply tank, and an oil burner, one type of consumer contemplated, is indicated by the numeral 12. A return pipe 14 extends from the burner to the supply tank and a supply or feed pipe 16 is arranged to convey liquid from the tank to the burner. The excess liquid not drawn into the burner 12 through the oil feed line broadly indicated by the numeral 18 flows through a by-pass 20 back into the return pipe 14.

The means provided for incorporating the feed and return pipes, respectively, in an electric circuit to thereby heat the liquid passing through the pipes is somewhat like that illustrated in my copending application above referred to, but is substantially improved by the use of an autotransformer or autocoil, broadly indicated by the numeral 22, inserted between the main line L and the heat transformer, broadly indicated by the numeral 24, controlling the circuit through the pipes. As illustrated, the autotransformer is connected to the primary side of the heat transformer instead of using a series of taps on the heat transformer primary as described in the aforesaid copending application. In this manner a wider range of current flow is possible and use of a single size transformer to cover a large number of installations becomes possible.

The autotransformer is connected to a relay switch, broadly indicated by the numeral 26, other terminals of the relay being tied in directly to the main line L. The contacts of the relay 26 are tied in to a thermostatic switch 28 which is controlled in some suitable manner, as illustrated, by the temperature of the liquid in the feed pipe 16.

One end of the primary of heat transformer 24 is connected by lead 30 to one of the leads connecting the autotransformer and the relay switch and the other end of said heat transformer primary may be connected at various points to the winding of the autotransformer, as by means of a sliding contact 32.

One end of the heat transformer secondary is connected by a lead 34 to that end of the return pipe 14 nearest the burner by some suitable means, such as the clamp 36. The other end of the heat transformer secondary is connected by lead 38 to that end of the feed pipe adjacent the burner, or to the burner feed 18 itself by a clamp 40, the circuit being carried back through the burner feed to the end of the feed pipe 16 by means of a jump lead 42 connected by clamps 43 and 44. An insulated coupling 46 is inserted on the burner side of the return pipe to prevent wandering of the current and break the loop circuit line formed through the burner by both suction and return pipes. Any suitable form of coupling may be used, such as the one described in detail for that purpose in my copending application.

A neutral tap 41 of the transformer secondary is taken off at a percentage ratio, as indicated in the drawing, and connected to points adjacent the other ends of the feed and return pipes in a manner to be described in detail. The neutral cable may be tapped to the feed and return lines wherever convenient, provided the pipe lines are of sufficient length to create the necessary resistivity. Neutral cable 43 and cable 45, which latter is connected at one end by clamp 47 to that end of the return pipe 14 adjacent the supply tank, are connected to the outer end of a conducting rod 49 as indicated at 51.

The return pipe 14 is coupled through a T joint 48 with a depending return pipe portion broadly indicated in Fig. 1 by the numeral 50 which extends inside the supply tank. This particular structure is illustrated in detail in Figs. 2 and 3 where an insulating joint 52 couples the return pipe 14 to the said T joint. The joint structure will be more particularly described hereinafter.

The depending portion of the return pipe comprises a section 58 threaded at its upper end into the T and at its lower end into a double-tapped bushing 60 which is in turn threaded into a collar 62 surrounding an opening in the tank. A lower section 64 extends through the tank opening and is threaded to the inside of bushing 60. To the lower end of section 64 is threaded a coupling 66 provided with internal threads at its lower end adapted to receive in threaded engagement therewith an extension 68 which extends substantially to the bottom of the supply tank.

Positioned inside extension 68 by means of a through bolt 70 is a wood block 72. The upper surface of this block is contoured as indicated at 74 to provide a seat for supporting and centering the cap 76 of foot valve 78 threaded onto the end of suction stub 56, which extends inside the tank in substantially concentric relation to and inside the depending portion of the return pipe.

The foot valve itself is arranged for gravity seating and permits one-way flow of liquid into the suction stub, being centered through a stem 82 in a manner clearly illustrated in my above referred to copending application. Liquid is admitted from the supply tank to the foot valve through radially disposed apertures 84 in extension 68 of the return pipe which are in substantial alignment with the valve. A spider 85 threaded into the foot valve is provided with a recessed central head portion 86 adapted to receive valve stem 82.

A short extension 17 is joined to feed pipe 16 by union 19. This extension and suction stub 56 are threaded into nipples of a standard T joint 88. Conducting rod 49 extends through a stuffing gland, broadly indicated in Fig. 2 by the numeral 90, threaded into an insulated reducing bushing 92 which is in turn threaded into the T joint 88, all as clearly illustrated in detail in my aforesaid application. The said rod extends through suction stub 56 and its other end is threaded into the head 86 of spider 85. Suction stub 56 is positioned in spaced telescoping relation within and insulated from the depending portion 50 of the return pipe by means of an insulating bushing 54 through which the said stub is secured to a third nipple of T joint 48. This bushing is identical with bushing 52 and is illustrated in detail in Fig. 3.

The insulated bushing is designed somewhat along the lines of the stuffing gland illustrated herein and described in detail in my aforesaid application except for the fact that the metal parts of the gland are held out of contact with the feed and return pipes by means of insulated sleeevs. The sleeves are formed in sections with tapered surfaces between each section, and so positioned as to force insulated packing rings against the wall of the pipe and gland when pressure is exerted on the sleeve by screwing down the gland.

Referring more particularly to Fig. 3, one end of a double-tapped stuffing gland 94 is threaded into a nipple of T joint 48, the lower end of the gland being provided with an annular shoulder 96 extending inwardly and adapted to form a seat for a corresponding annular, outwardly extending, shoulder 98 on insulating sleeve 100 which is dropped in between the said shoulder 96 and suction stub 56 extending down through T joint 48. Insulating rings 102 and 104, having alternately tapered upper and lower faces as clearly indicated in Fig. 3, are placed in the space between the suction stub and the gland. The upper annular face of sleeve 100 is likewise tapered in a direction opposite to that of ring 102 immediately above it. Another insulating sleeve 106 similar to sleeve 100, the lower annular face of which is tapered in a direction opposite to that of ring 104, is then slipped over the suction stub and the gland cap 108 is threaded onto the upper tap of the double-tapped gland 94. Insulating material 110 of a soft compressible substance is interposed between the oppositely disposed faces of rings 102 and 104 and similar material is interposed between the upper and lower faces of said rings and the annular faces of insulating sleeves 100 and 106.

Thus it will be seen that as the gland cap 108 is threaded down pressure will be brought to bear upon shoulder 112 of sleeve 106. The sleeves and rings are of relatively hard insulating substance and the resultant pressure will operate to force the relatively soft insulating material 110 inwardly against the suction stub 56 and outwardly against the inner wall of stuffig gland 94. Thus a fluid seal is obtained and the T joint 48 is effectively insulated from current flowing through the suction stub 56 and back along conductor rod 49. In like manner the insulating joint 52, which is identical with joint 54, functions to insulate the T joint 48 from any current which may tend to pass cable connection 47 and continue on along return pipe 14 in lieu of passing through cable 45 to connection 51 and thence through neutral cable 43 back to the transformer secondary.

Another important feature of this insulating joint construction resides in the ease with which the suction stub and foot valve may be removed from the assembly when it becomes necessary to do so for inspection or repair purposes. By merely disconnecting the cables 43 and 45 from conductor rod 49, removing the union 19 to release the main part of feed pipe 16, and removing the gland cap 108, it becomes possible to withdraw the suction stub 56 and its associated foot valve as a unit.

From the foregoing, operation of this particular installation will be clear. Inasmuch as it is necessary and desirable to provide the return pipe 14 with sufficient heat only to compensate for that lost during the initial travel of the oil in reaching the return pipe, the current supplied to said return pipe need not be as great as that supplied the feed pipe 16 and suction stub 56. For that reason neutral tap 41 may be selected in such manner that the major quantity of current from the heat transformer secondary passes through cable 38, oil feed line 18, jump cables 42, feed pipe 16, along suction stub 56 to spider 85, across the spider to the conductor rod 49, and thence back through neutral cable 43 to the neutral tap 41. Current from the other end of the transformer passes through cable 34 to and through return pipe 14 and thence through cable 45 to connection 51 and back through neutral cable 43 to the neutral tap of the transformer.

Due to the use of autocoil 22, selective control of the current flowing from the heat transformer is obtainable. The thermostatically controlled switch 28 operating relay 26 insures constantly uniform temperature of the liquid flowing in the system. By taking the neutral tap off the secondary of the heat transformer at a selected point, compensation can be made for feed and return pipes of various lengths, thickness, etc., and consequent differences in resistivity in the two separate circuits. Additional resistance could be inserted where the circumstances of any particular installation required the same rather than adding extra pipe to the installation to provide such resistance.

From Fig. 2 it will be apparent that the oil drawn through suction stub 56 is heated by the stub itself and by the conductor rod 49, the oil passing through the stub forming an annular column passing upward into the feed pipe 16 and thence to the burner. Furthermore, the oil emptied into the tank by that portion of the return pipe extending down into the tank is discharged in close proximity to the intake end, or foot valve, of the suction stub. Thus not only is some of the discharged oil drawn back through the suction stub, but the heat retained thereby is transferred to oil drawn from elsewhere in the tank through apertures 84 in extension 68 and thence through the foot valve into the suction stub. The extension 68 serves to concentrate the discharged heated oil around the bottom of the tank and control the flow thereof away from the suction stub to points in the tank remote therefrom. In this manner maximum efficiency of the heat supplied from the pipes to the oil is obtained and consequently the necessary kilowatt output for heating the pipes is reduced to a minimum.

It should likewise be noted that, by reason of the telescoping of conductor 49 inside suction stub 56, and of the suction stub inside depending portion 50 of the return pipe, several important heat exchange possibilities are created. Where the suction stub and conductor are included in circuit, the heated stub serves to heat the oil passing, in opposite directions respectively, through both the stub and the surrounding depending portion 50 of the return pipe. Maximum efficiency of heat transfer to the oil in this part of the flow system is thus obtained. When the stub is not in circuit and the oil or liquid is heated in some other manner, a portion of the heat in the returned oil passing through depending portion 50 of the return pipe is transferred through the suction stub to the oil passing upwardly therethrough. Of course this transfer would occur only when the returned oil is of a higher temperature than that in the tank, as where the tank supply was cold.

It should be understood that the concept of this invention contemplates the use of other heat sources for heating the liquid, such as oil, and the arrangement for discharging the heated liquid from the return in proximity to the intake of the suction stub, concentrating the same about such intake and controlling the flow away from such intake to other parts of the tank represent an important phase of the invention.

A somewhat modified arrangement for accomplishing this last above described desideratum has been disclosed in Figs. 4-7. Fig. 4 is a diagrammatic illustration and the structure and circuits outside the tank are substantially the same as those hitherto described with reference to Fig. 1. Current from the main line L passes through one cable to thermostat 114, which is connected by another cable 116 to a contact of the relay switch, which together with the autocoil and heating transformer are positioned in control box 118. The circuits are the same with reference to burner 12 and the return pipe 120, which latter in this instance is provided with a depending portion 122 which extends down into the tank 124 in laterally disposed relation to suction stub 126 of the feed pipe. An insulating joint 128, which may be similar to that referred to as 46 in describing Fig. 1, cuts out of circuit that portion of the depending portion 122 which extends within the tank, and of course the tank itself. The circuit through the return pipe 120 is carried by jump cable 130 to connection 132, associated with conductor rod 49, and thence back to the heat transformer through neutral cable 134.

Suction stub 126 is the same as stub 56, and the manner in which it is led into the tank, associated with the foot valve, and connected to portion 136 of the return line is identical with the arrangement illustrated in Figs. 1–3. In this particular instance the feed pipe discharges into a hot water heated oil heater 138 from which the liquid is drawn by the burner pump through pipe 140 to the burner. A jump cable 142 carries the circuit around the secondary supply tank and insulating joints 143 and 145 cut the heater 138 out of circuit. A pressure reducing valve 145, insulated from the feed and return lines by insulating bushing 147, is interposed in a bypass, broadly indicated by numeral 149, between the feed and return pipes. This arrangement is desirable only where the installation includes two or more burners.

In this modification, however, the liquid is discharged through pipe 122 into an oil chest 144, from which chest oil is drawn through the suction stub 126 to feed the consumer. The structural details of this oil chest are more clearly illustrated in Figs. 5–7, wherein a tank installation for two burners, utilizing two suction stubs 126 and one return 122, has been disclosed.

Inasmuch as installation of mechanism inside the tank is strictly limited by a standard sixteen-inch manhole, the parts for this chest must be so designed that the component units may be inserted in the tank and assembled to form the composite whole. The chest 145 illustrated for a two-burner installation comprises four units which are bolted together after insertion in the tank. Two end base units 146 constituting what might be termed semi-domes and provided with apertured ears 148 are bolted to an intermediate base unit 150, which is provided with supporting legs 152 on two sides only and apertured ears adapted to align with those on the end base units. The three legs of the end base units and the two oppositely disposed legs of the intermediate base unit are scalloped as indicated at 154 and it will be apparent that when the units are bolted together a series of spaced scallops along the vertical supporting leg portion of the composite unit will result. Each of the units is provided with a horizontal flange 156 about its upper margin, which flange is apertured at spaced intervals to receive bolts 158 by means of which a cover 160, of wood or other insulating material, is secured to the opening formed in the upper portion of the composite chest assembly.

The cover 160 illustrated is provided with openings 162 adapted to snugly receive the foot valve assemblies 164 of suction stubs 126. A smaller opening 166 in the cover is adapted to receive the depending portion 122 of the return pipe.

Thus it will be seen that the liquid returned through pipe portion 122 is discharged within the chest from which the feed is drawn through suction stubs 126. The chest forms a pocket at the bottom of the tank which retains some of the heated oil returned from the burner, or consumer, and renders available a substantial supply of this oil for re-feeding through the suction stubs in addition to mixing with unheated oil admitted through the scalloped openings 156 from other portions of the tank to thereby supply it with some of its retained heat. The cover 160 prevents the discharged liquid from rising to the surface inside the tank and confines the circuit passing down the suction stubs 126 to the conductor rods.

An additional advantage in providing a pocket of substantial size such as that formed by the oil chest assembly resides in the fact that a reserve supply of heated oil for starting is retained therein during periods when the burner is cut off. By reason of the particular design of the individual elements comprising the composite chest, installations for any number of burners can be assembled by using only a very few standard parts. Thus the size of the chest can be increased longitudinally indefinitely by inserting more intermediate units 150 between the end units 146. Furthermore, the end units 146 are duplicates and for that reason it will be apparent that chest installations of substantially any size can be assembled by using two standard parts and a cover 160 including the desired number of openings of the proper size.

Certain preferred embodiments of the invention have been illustrated and described herein, but it will be apparent that various modifications involving the use of mechanical equivalents and falling within the scope of the inventive concept will be obvious to those skilled in the art and for that reason I wish to limit myself only within the scope of the appended claims.

What I claim is:

1. That method of insuring flow of a viscous liquid in a flow system comprising a supply tank, a consumer of such liquid, a feed pipe extending from said tank to said consumer and including a suction stub extending inside the tank and comprising an annular liquid passage communicating with an open pipe outside the tank, and a return pipe extending from the consumer and emptying into the tank, which includes the steps of passing an electric current through the walls of the annular stub passage to thereby heat the liquid before it reaches the consumer, passing some of the heated liquid into and through the return pipe, and discharging the liquid from the return pipe into the tank in proximity to the suction stub to thereby transfer a portion of its remaining heat to the liquid passing through said stub.

2. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of passing an electric current through the feed pipe to thereby heat the liquid before it reaches the consumer, passing some of the heated liquid into and through the return pipe, passing a separate electric current through the return pipe to thereby heat the liquid therein, and discharging the liquid from the return pipe into the tank in proximity to the suction stub to thereby transfer a portion of its remaining heat to the liquid passing through said stub.

3. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of passing an electric current through the feed pipe to thereby heat the liquid before it reaches the consumer, passing some of the heated liquid into and through the return pipe, passing an electric current through the return pipe to thereby heat the liquid therein, discharging the liquid from the return pipe into the tank in proximity to the suction stub to thereby transfer a portion of its remaining heat to the liquid passing through said stub, and controlling independently the current flow in the feed and return pipes respectively to maintain uniformity of temperature of the liquid delivered to the consumer.

4. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of including the feed and return pipes in separate circuits, simultaneously energizing the feed pipe circuit and the return pipe circuit with currents differing in amount, and discharging the liquid from the return pipe into the tank in proximity to the suction stub to thereby transfer a portion of its remaining heat to the liquid passing through said stub.

5. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of including the feed and return pipes in separate circuits, simultaneously energizing the feed pipe circuit and the return pipe circuit with currents differing in amount, and discharging the liquid from the return pipe into the tank in a column surrounding the suction stub to thereby transfer a portion of its remaining heat to the liquid passing through said stub.

6. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of including the feed and return pipes in separate circuits, simultaneously energizing the feed pipe circuit and the return pipe circuit with currents differing in amount, discharging the liquid from the return pipe into the tank at a point in substantial proximity to the end of the suction stub to thereby transfer a portion of its remaining heat to the liquid passing through said stub, and concentrating the discharged liquid about the end of said stub.

7. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of including the feed and return pipes in separate circuits, simultaneously energizing the feed pipe circuit and the return pipe circuit with currents differing in amount, discharging the liquid from the return pipe into the tank at a point in substantial proximity to the end of the suction stub to thereby transfer a portion of its remaining heat to the liquid passing through said stub, and concentrating the discharged liquid about the end of said stub while controlling the quantity of unheated liquid flowing from elsewhere in the tank to the end of the stub.

8. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of splitting unequally a transformer secondary and including the feed and return pipes respectively in separate circuits, each of which is completed through a connection to the same selected secondary neutral transformer tap to thereby heat the liquid in said pipes, and discharging the liquid from the return pipe into the tank in proximity to the suction stub to thereby transfer a portion of its remaining heat to the liquid passing through said stub.

9. That method of insuring flow of a viscous liquid in a flow system comprising a supply tank, a consumer of such liquid, a feed pipe extending from said tank to said consumer and including a suction stub extending inside the tank, and a return pipe extending from the consumer and emptying into the tank, which includes the steps of splitting unequally a transformer secondary and including the feed and return pipes respectively in separate circuits, each of which is completed through a connection to the same selected secondary neutral transformer tap to thereby heat the liquid in said pipes, and discharging the liquid from the return pipe into the tank in a column surrounding the suction stub to thereby transfer a portion of its remaining heat to the liquid passing through said stub.

10. An arrangement of the class described comprising, in combination, a supply tank, a liquid consumer, a feed pipe from the consumer to the tank including a suction stub extending inside the tank and comprising an annular liquid passage communicating with an open pipe outside the tank, a return pipe from the consumer to the tank, a source of electric current, means incorporating the walls of said annular stub passage in circuit to thereby heat the liquid passing therethrough, and means whereby unconsumed heated liquid is passed through the return pipe, said return pipe extending inside the tank and arranged therein to discharge the heated liquid in proximity to the suction stub.

11. An arrangement of the class described comprising, in combination, a supply tank, a liquid consumer, a feed pipe from the consumer to the tank including a suction stub extending inside the tank, a return pipe from the consumer to the tank, a source of electric current, means incorporating a portion of said feed and return pipes in separate circuits carrying currents varying in amount to thereby heat the liquid passing therethrough, and means whereby unconsumed heated liquid is passed through the return pipe, said return pipe extending inside the tank and arranged therein to discharge the heated liquid in proximity to the suction stub.

12. An arrangement of the class described comprising, in combination, a supply tank, a liquid consumer, a feed pipe from the consumer to the tank including a suction stub extending inside the tank, a return pipe from the consumer to the tank, a source of electric current, means incorporating a portion of said feed and return pipes in separate circuits varying in amount to thereby heat the liquid passing therethrough, means for varying the amount of current in each separate circuit, and means whereby unconsumed heated liquid is passed through the return pipe, said return pipe extending inside the tank and arranged therein to discharge the heated liquid in proximity to the suction stub.

13. In combination with a liquid supply tank for use with feed and return pipes, a pipe extending into the tank and secured to the wall thereof at its point of passage, a three-way pipe joint secured at one passage to the outer end thereof, a second pipe secured to another passage of said joint and extending into said tank in spaced telescoping relation within said first pipe, and a sleeve pipe coupling associated with the third passage of said joint whereby a pipe may be detachably coupled therewith.

14. In combination with a liquid supply tank for use with feed and return pipes, a pipe extending into the tank and secured to the wall thereof at its point of passage, a three-way pipe joint secured at one passage to the outer end thereof, a second pipe secured to another passage of said joint and extending into said tank in spaced telescoping relation within said first pipe, a sleeve pipe coupling associated with the third passage of said joint whereby a return pipe may be detachably coupled therewith, a pipe joint secured to the outer end of said inside pipe, and a sleeve pipe coupling associated with said joint whereby a feed pipe may be detachably coupled therewith.

15. In combination with a liquid supply tank for use with feed and return pipes, a pipe extending into the tank and secured to the wall thereof at its point of passage, a three-way pipe joint secured at one passage to the outer end thereof, a second pipe secured to another passage of said joint and extending into said tank in spaced telescoping relation within said first pipe, a sleeve pipe coupling associated with the third passage of said joint whereby a pipe may be detachably coupled therewith, and a seat secured within the passage of the outside pipe adjacent the end within the tank, said seat cooperating with the end of the inside pipe to support and position the same with reference to the outside pipe.

16. In combination with a liquid supply tank for use with feed and return pipes, a pipe extending into the tank and secured to the wall thereof at its point of passage, a three-way pipe joint secured at one passage to the outer end thereof, a second pipe secured to and insulated from another passage of said joint and extending into said tank in spaced telescoping relation within said first pipe, an insulating sleeve pipe coupling associated with the third passage of said joint whereby a return pipe may be detachably coupled with and insulated from the same, a pipe joint secured to the outer end of said inside pipe, and a sleeve pipe coupling associated with said joint whereby a feed pipe may be detachably coupled therewith.

17. In combination with a liquid supply tank for use with feed and return pipes, a pipe extending into the tank and secured to the wall thereof at its point of passage, a three-way pipe joint secured at one passage to the outer end thereof, a second pipe secured to and insulated from another passage of said joint and extending into said tank in spaced telescoping relation within said first pipe, an insulating sleeve pipe coupling associated with the third passage of said joint whereby a return pipe may be detachably coupled with and insulated from the same, a pipe joint secured to the outer end of said inside pipe, a sleeve pipe coupling associated with said joint whereby a feed pipe may be detachably coupled therewith, and an insulating seat secured within the passage of the outside pipe adjacent the end within the tank, said seat cooperating with the end of the inside pipe to support and position the same with reference to the outside pipe and insulating the one from the other.

18. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer and opening into said tank, a conductor positioned inside and in spaced relation to that portion of the feed pipe extending within the tank, said conductor passing outside the feed pipe and being insulated therefrom at the point of passage, a second conductor between said first-mentioned conductor and the feed pipe, a transformer, a source of electric current connected to the primary thereof, connections between the transformer secondary end taps and corresponding respective ends of the feed and return pipes, and a connection between the end of the return pipe and the exposed end of said first-mentioned conductor.

19. That method of electrically heating feed and return pipes extending from a source of viscous oil to a liquid oil burner and maintaining a substantially constant oil temperature throughout the system which consists in including the feed and return lines in separate circuits, simultaneously energizing the feed line circuit and the return line circuit with currents differing in amount, and controlling the current flow in both circuits in accordance with the temperature of the oil in the feed line.

20. That method of obtaining from a single electric current source unequal distribution of current in a pair of flow pipes which consists in splitting unequally the transformer secondary and including the pipes respectively in separate circuits, each of which is completed through a connection to the same selected secondary neutral transformer tap.

21. That method of automatically distributing electric heating current flowing respectively in a feed pipe and a return pipe for viscous liquids which comprises insulating the pipes from each other, connecting the end taps of a transformer secondary to corresponding ends of the respective pipes and connecting the other ends of the respective pipes to the neutral tap of the transformer secondary winding extended from such point as will produce the desired ratio of current in the two pipe line circuits.

22. A system for electrically heating viscous liquid to be fed to an oil burner comprising, in combination, a supply of viscous liquid, a burner, feed and return pipes extending from the supply to the burner, a source of electric current, means for splitting the output from said source into currents of different amount, and means for passing the respective currents through said pipes, respectively, to thereby heat the same to a degree proportionate to the current passed therethrough.

23. A system for electrically heating viscous liquid to be fed to an oil burner comprising, in combination, a supply of viscous liquid, a burner, feed and return pipes extending from the supply to the burner, a source of electric current, means for splitting the output from said source into currents of different amount, means for passing the greater current through the feed pipe, and means for passing the lesser current through the return pipe.

24. A system for electrically heating viscous liquid to be fed to an oil burner comprising, in combination, a supply of viscous liquid, a burner, feed and return pipes extending from the supply to the burner, a source of electric current, means for splitting the output from said source into currents of different amount, means for passing the respective currents through said pipes, respectively, to thereby heat the same to a degree proportionate to the current passed therethrough, and means controlled by the temperature of the liquid in the feed pipe for stopping or starting the current flow through both pipes.

25. A system for electrically heating viscous liquid to be fed to an oil burner comprising, in combination, a supply tank for viscous liquid, a burner, a feed pipe extending from the burner into the tank to a point adjacent the bottom thereof, a return pipe from the inner surface of said tank to said burner, a source of electric current, means for splitting the output from said source into currents of different amount, and means for passing the respective currents through said pipes, respectively, to thereby heat the same to a degree proportionate to the current passed therethrough.

26. A system for electrically heating viscous liquid to be fed to an oil burner comprising, in combination, a supply of viscous liquid, a burner, feed and return pipes extending from the supply to the burner, a source of electric current, means for varying the output thereof, means for splitting the output from said source into currents of different amount, and means for passing the respective currents through said pipes, respectively, to thereby heat the same to a degree proportionate to the current passed therethrough.

27. A system for electrically heating viscous liquid to be fed to a consumer thereof comprising, in combination, a supply of viscous liquid, a consumer thereof, feed and return pipes extending from the supply to the consumer, a transformer, a source of electric current connected to the primary thereof, connections between the transformer secondary end taps and corresponding respective ends of the feed and return pipes, and connections between the other ends of said pipes and the neutral tap of the transformer secondary.

28. A system for electrically heating viscous liquid to be fed to a consumer thereof comprising, in combination, a supply of viscous liquid, a consumer thereof, feed and return pipes extending from the supply to the consumer, a transformer, a source of electric current connected to the primary thereof, connections between the transformer secondary end taps and corresponding respective ends of the feed and return pipes, and connections between the other ends of said pipes and the neutral tap of the transformer secondary, said neutral tap being taken off the secondary winding at such a point as to distribute the current in predetermined ratio between the feed and return pipes.

29. A system for electrically heating viscous liquid to be fed to a consumer thereof comprising, in combination, a supply of viscous liquid, a consumer thereof, feed and return pipes extending from the supply to the consumer, a transformer, a source of electric current connected to the primary thereof, connections between the transformer secondary end taps and corresponding respective ends of the feed and return pipes, connections between the other ends of said pipes and the neutral tap of the transformer secondary, and means for varying the output of said transformer.

30. A system for electrically heating viscous liquid to be fed to a consumer thereof comprising, in combination, a supply of viscous liquid, a consumer thereof, feed and return pipes extending from the supply to the consumer, a transformer, a source of electric current connected to the primary thereof, connections between the transformer secondary end taps and corresponding respective ends of the feed and return pipes, connections between the other ends of said pipes and the neutral tap of the transformer secondary, and means for varying the output of said transformer, said means comprising staged winding taps in the primary of said transformer whereby a portion thereof may be cut out of circuit.

31. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer to the inner surface of said tank, a conducting rod positioned inside and in spaced relation to that portion of the feed pipe extending within the tank, said rod passing outside of the feed pipe at a point outside the tank and being insulated from the pipe at the point of passage, an electric conductor between the inner extremity of said rod and the feed pipe adjacent the extremity of the latter, a transformer, a source of electric current connected to the primary thereof, connections between the transformer secondary end taps and corresponding respective ends of the feed and return pipes, and connections between the neutral tap of the transformer secondary and the end of the return pipe and the exposed end of said conducting rod, respectively.

32. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer to the inner surface of said tank, a conducting rod positioned inside and in spaced relation to that portion of the feed pipe extending within the tank, said rod passing outside of the feed pipe at a point outside the tank and being insulated from the pipe at the point of passage, an electric conductor between the inner extremity of said rod and the feed pipe adjacent the extremity of the latter, a transformer, a source of electric current connected to the primary thereof, connections between the transformer secondary end taps and corresponding respective ends of the feed and return pipes, and connections between the neutral tap of the transformer secondary and the end of the return pipe and the exposed end of said conducting rod, respectively, said neutral tap being taken off the secondary winding at such a point as to distribute the current in predetermined ratio between the feed and return pipes.

33. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer to the inner surface of said tank, a conducting rod positioned inside and in spaced relation to that portion of the feed pipe extending within the tank, said rod passing outside of the feed pipe at a point outside the tank and being insulated from the pipe at the point of passage, an electric conductor between the inner extremity of said rod and the feed pipe adjacent the extremity of the latter, a transformer, a source of electric current connected to the primary thereof, connections between the transformer secondary end taps and corresponding respective ends of the feed and return pipes, connections between the neutral tap of the transformer secondary and the end of the return pipe and the exposed end of said conducting rod, respectively, said neutral tap being taken off the secondary winding at such a point as to distribute the current in predetermined ratio between the feed and return pipes, and means for varying the output of said transformer, said means comprising staged winding taps in the primary of said transformer whereby a portion thereof may be cut out of circuit.

34. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer and opening into said tank, a conductor positioned inside and in spaced relation to that portion of the feed pipe extending within the tank, said conductor passing outside the feed pipe and being insulated therefrom at the point of passage, a second conductor between said first-mentioned conductor and the feed pipe, a transformer, a source of electric current connected to the primary thereof, connections between the transformer secondary end taps and corresponding respective ends of the feed and return pipes, and connections between the neutral tap of the transformer secondary and the end of the return pipe and the exposed end of said first-mentioned conductor, respectively.

35. That method of insuring flow of a viscous liquid in a flow system comprising a supply tank, a consumer of such liquid, a feed pipe extending from said tank to said consumer and including a suction stub extending inside the tank and comprising an annular liquid passage communicating with an open pipe outside the tank, and a return pipe extending from the consumer and emptying into the tank, which includes the steps of passing an electric current through the inside wall of the annular stub passage to thereby heat the liquid before it reaches the consumer, and passing some of the heated liquid into and through the return pipe.

36. That method of insuring flow of a viscous liquid in a flow system comprising a supply tank, a consumer of such liquid, a feed pipe extending from said tank to said consumer and including a suction stub extending inside the tank and comprising an annular liquid passage communicating with an open pipe outside the tank, and a return pipe extending from the consumer and emptying into the tank, which includes the steps of passing an electric current through the inside wall of the annular stub passage to thereby heat the liquid before it reaches the consumer, passing some of the heated liquid into and through the return pipe, and discharging the liquid from the return pipe into the tank in proximity to the suction stub to thereby transfer a portion of its remaining heat to the liquid passing through said stub.

37. That method of insuring flow of a viscous liquid in a flow system comprising a supply tank, a consumer of such liquid, a feed pipe extending from said tank to said consumer and including a suction stub extending inside the tank and comprising an annular liquid passage communicating with an open pipe outside the tank, and a return pipe extending from the consumer and emptying into the tank, which includes the steps of passing an electric current through the inside wall of the annular stub passage to thereby heat the liquid before it reaches the consumer, passing some of the heated liquid into and through the return pipe, and discharging the liquid from the return pipe into the tank in an annular column surrounding the suction stub to thereby transfer a portion of its remaining heat to the liquid passing through said stub.

38. An arrangement of the class described comprising, in combination, a supply tank, a liquid consumer, a feed pipe from the consumer to the tank including a suction stub extending inside the tank and comprising an annular liquid passage communicating with an open pipe outside the tank, a return pipe from the consumer to the tank, a source of electric current, means incorporating the inside wall of the annular stub passage in circuit to thereby heat the liquid passing therethrough, and means whereby unconsumed heated liquid is passed through the return pipe.

39. An arrangement of the class described comprising, in combination, a supply tank, a liquid consumer, a feed pipe from the consumer to the tank including a suction stub extending inside the tank and comprising an annular liquid passage communicating with an open pipe outside the tank, a return pipe from the consumer to the tank, a source of electric current, means incorporating the inside wall of the annular stub passage in circuit to thereby heat the liquid passing therethrough, and means whereby unconsumed heated liquid is passed through the return pipe, said return pipe extending inside the tank and arranged therein to discharge the heated liquid in proximity to the suction stub.

40. An arrangement of the class described comprising, in combination, a supply tank, a liquid consumer, a feed pipe from the consumer to the tank including a suction stub extending inside the tank and comprising an annular liquid passage communicating with an open pipe outside the tank, a return pipe from the consumer to the tank, a source of electric current, means incorporating the inside wall of the annular stub passage in circuit to thereby heat the liquid passing therethrough, and means whereby unconsumed heated liquid is passed through the return pipe, said return pipe extending inside the tank and forming an annular column about the suction stub.

41. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer and opening into said tank, a conductor positioned inside and in spaced relation to that portion of the feed pipe extending within the tank, and means for passing an electric current through said conductor.

42. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer and opening into said tank, a conductor positioned inside and in spaced relation to that portion of the feed pipe extending within the tank, and means for passing an electric current through said conductor and that portion of the feed pipe extending within the tank.

43. A system for electrically heating viscous liquid to be fed to a consumer thereof comprising, in combination, a supply tank, a consumer, a feed pipe extending from the consumer to a point within the tank, means for insulating said pipe from said tank, a return pipe extending from the consumer and opening into said tank, a conductor positioned inside and in spaced relation to that portion of the feed pipe extending within the tank, and means for passing an electric current through said conductor, said return pipe extending into said tank and surrounding that portion of the feed pipe positioned therein.

JOHN R. PROCTOR.